United States Patent [19]
Campbell

[11] Patent Number: 4,748,762
[45] Date of Patent: Jun. 7, 1988

[54] FISHING POLE HOLDER

[76] Inventor: Larry E. Campbell, 27575 Elderview Dr., Valencia, Calif. 91355

[21] Appl. No.: 911,732

[22] Filed: Sep. 26, 1986

[51] Int. Cl.$^4$ ............................................. A01K 97/00
[52] U.S. Cl. ..................................... 43/21.2; 248/533
[58] Field of Search ............... 43/21.2, 54.5; 248/530, 248/532, 533; 206/315.11; 224/200

[56] References Cited

U.S. PATENT DOCUMENTS

| | | | |
|---|---|---|---|
| 1,577,612 | 3/1926 | Dees | 43/21.2 |
| 2,564,065 | 8/1951 | Jaden | 248/533 |
| 2,665,866 | 1/1954 | Goldinger | 43/21.2 |
| 2,839,865 | 6/1958 | Lubanski | 43/21.2 |
| 3,154,274 | 10/1964 | Hillcourt | 43/21.2 |
| 3,924,345 | 12/1975 | Sapp | 43/21.2 |
| 4,628,628 | 12/1986 | Burgin | 43/21.2 |

FOREIGN PATENT DOCUMENTS

| | | | |
|---|---|---|---|
| 447882 | 4/1948 | Canada | 43/21.2 |
| 1312759 | 1/1962 | France | 43/21.2 |

Primary Examiner—Kurt Rowan
Attorney, Agent, or Firm—Roger A. Marrs

[57] ABSTRACT

A fishing pole holder is disclosed herein having a cylindrical sleeve for supporting a multiple pronged grip adapted to insertably receive the handle of a fishing pole. The sleeve is hollow so as to define a storage cavity or compartment for storing the prongs and for housing a plurality of survival implements. A support spike useful in supporting the fishing pole in the ground during a fishing procedure is pivotally mounted on the external wall of the sleeve and a manually locking pin is carried thereon for latching the spike in a stowed position or an operative position. End caps close and seal the storage compartment of the sleeve.

7 Claims, 1 Drawing Sheet

FISHING POLE HOLDER

BACKGROUND OF THE INVENTION

1. Field of the Invention

The present invention relates to holders for fishing poles and more particularly to a novel holder adapted to support a fishing pole in use and which includes a storage compartment for insertably receiving components of the holder when not in use and for storing a plurality of items concerned with survival.

2. Brief Description of the Prior Art

It has been the conventional practice to cast bait into the water carried at the end of a line operably working from a fishing pole. Once the casting has been done, the fisherman either hand holds the pole during the fishing procedure or supports the fishing pole while the fisherman turns his attention to other activities.

Although a plurality of fishing pole holders have been used for supporting the fishing pole on the ground, problems and difficulties have been encountered with conventional holders which stem from the fact that they are not interchangeable from one fishing pole to another nor will they usually accept a variety of fishing poles due to differences in diameter and pole construction. Also, most holders are either worn by the fisherman himself or require an elaborate support base into which the fishing pole is inserted. The prior more conventional supports are not collapsible and cannot be readily stored with the fishing pole itself so that the use of a separate and independent holder is cumbersome and awkward to use as well as to store. Additionally, conventional holders do not provide storage for accessories or other useful tools or the like which would be handy for a fisherman to use.

Therefore, a long standing need has existed to provide a novel fishing pole holder which may be readily folded or collapsed into a storage position so that the holder may be readily carried on the end of a fishing pole. It is also of concern that means be provided for storing small tools, emergency equipment or the like so that these implements are available to the fisherman when desired.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
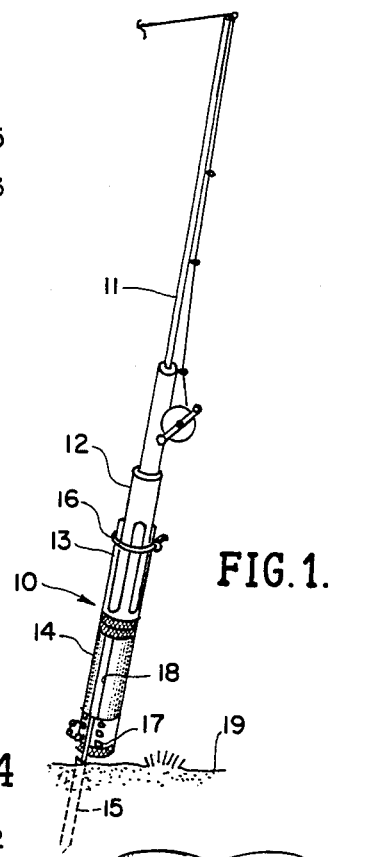
FIG. 1 is a perspective view showing a typical fishing pole mounted in the novel holder incorporating the present invention.

Referring to FIG. 1, the novel fishing pole holder of the present invention is shown in the general direction of arrow 10 which is used for supporting a conventional fishing pole 11 by means of insertably positioning its handle 12 into a set of prongs indicated in general by numeral 13. The prongs are removably carried on the end of a sleeve 14 which is hollow and may be used for storing a plurality of survival implements and components. The opposite end of the sleeve 14 from its end carrying the prongs 13 is provided with a pivotal spike 15 for insertion into the ground 19 when it is desired to support the fishing rod or pole 11 therefrom. A keeper 16 such as a tie-down or the like may be used for holding the plurality of prongs in position about the handle 12 after the handle has been inserted between the prongs. Also, a pin lock or latch 17 is employed for securing the spike 15 in either its operative position as shown in broken lines or in its stowed or stored position within a recess provided in the external surface of the sleeve 14. The recess for receiving the spike 15 for storage purposes is indicated by numeral 18.

Figure 2:
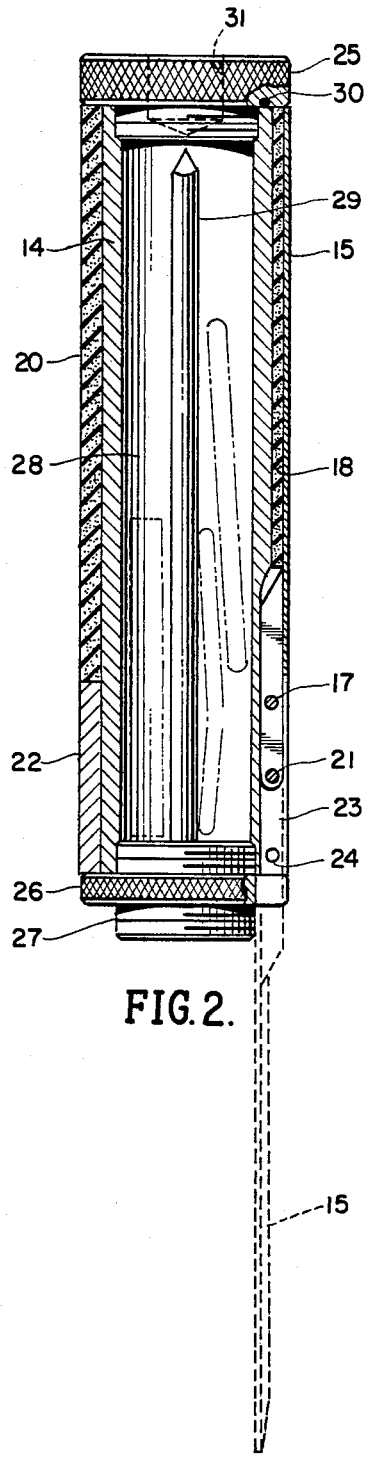
FIG. 2 is an enlarged longitudinal cross-sectional view of the novel fishing pole holder used in FIG. 1.

Referring now in detail to FIG. 2, it can be seen that the sleeve 14 includes an outer covering 20 of a soft, cushioned material. The recess 18 is formed through a portion of the covering 20 so that the spike 15 may reside therein when in the storage position. The spike 15 is pivotally carried on the sleeve by means of a pin 21 passing through a base portion 22 of the sleeve. The base portion includes a slot 23 which is coextensive with the recess 18 so that the spike may be pivoted about pin 21 into its operative position shown in broken lines. The pin latch 17 is illustrated as passing through aligned holes in the base 22 and the spike 15 so that the spike is held in the stored position. However, when the spike is deployed into its operative position, the pin 17 is removed and reinserted through aligned openings or holes indicated by numeral 24 so that the spike is held in the operative position.

It is also to be seen in FIG. 2 that one end of the sleeve is closed by means of a cap 25 that is threadably connected with the end of the bore of the sleeve. The opposite end of the sleeve is closed by means of a cap 26 which not only includes threads for threadably engaging with the other end of the bore of the sleeve but includes outwardly projecting threads 27 capable of mounting the cap in a reversed condition so that an elongated pick 29 can be used for a variety of survival or functional purposes. Additionally, the sleeve is hollow defining a storage compartment broadly referenced by numeral 28 wherein a variety of survival components can be stored. Such components or items can take the form of razor blades, string, fishing hooks, band aids or the like. Preferably, the caps are sealed to the opposite ends of the sleeve by means of O-ring seals such as seal 30. This provides a watertight arrangement for maintaining the items within the storage compartment completely dry.

Figure 5:
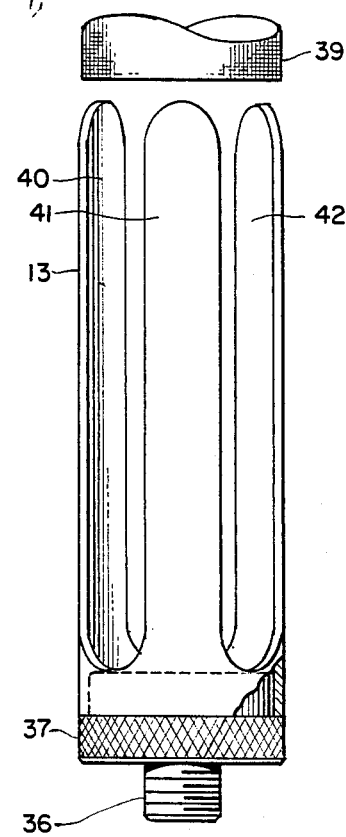
FIG. 5 is a side elevational view of a portion of the holder shown in FIGS. 2 and 3 preparatory for receiving a fishing pole.

It is to be particularly noted that the end cap 25 not only includes a threaded connection on one side with the bore of the sleeve, but includes a threaded bore 31 on the opposite side of the cap into which a threaded end 36, as shown in FIG. 5 carried on the end of the adjustable prongs 13. Therefore, the adjustable prongs can be carried on the end of the sleeve accordingly so that the plurality of prongs are in position for insertably receiving the handle 12 of the fishing rod 11.

Figure 3:
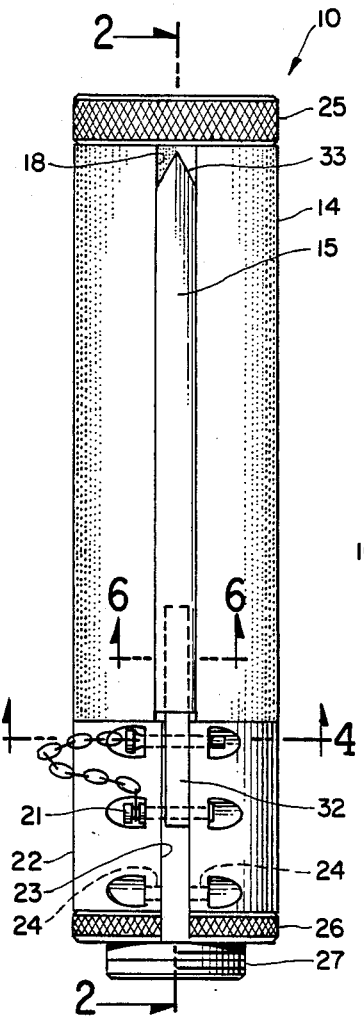
FIG. 3 is a side elevational view of the novel fishing pole holder.
Figure 4:
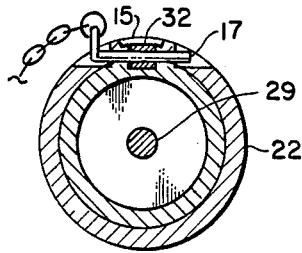
FIG. 4 is a transverse cross-sectional view of the fishing pole holder shown in FIG. 3 as taken in the direction of arrows 4—4 thereof.
Figure 6:
FIG. 6 is an enlarged transverse cross-sectional view of a support stake carried on the holder shown in FIG. 3 as taken in the direction of arrow 6—6 thereof.

Referring now in detail to FIGS. 3 and 6, it can be seen that the spike for supporting the fishing rod in the ground 19 comprises a support section 32 of square cross-section so as to provide strength and to provide sufficient mass for the provision of the openings therethrough in order to receive the locking pin 17. The primary length of the spike is of an arcuate cross-section and terminates in a pointed end 33. The arcuate portion of the spike may be welded or otherwise attached to the support section 32.

FIG. 5 illustrates that the threaded portion 36 is carried on one side of a base 37 and that the prongs such as indicated by numerals 40, 41 and 42 are carried on the opposite side. The prongs are cantilevered outwardly and, preferably, provide a normal biasing force against the pole handle when it is inserted therebetween. As a safety feature a protective sleeve 39 of expandable material is provided to slip over the prongs and the tie 16.

Therefore, it can be seen from the foregoing that a novel holder for a fishing rod is provided wherein the supporting spike 15 may be deployed between a stored position on the sleeve and an operative position downwardly projecting from the sleeve. The locking pin 17 will maintain the spike in a desired position. The storage compartment 28 can hold a variety of articles dealing with survival and the spike 29 may be readily deployed by removing end cap 26 and reversing its orientation so that the spike sticks out while threads 27 engage with the inner bore.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A fishing pole holder comprising:
   a cylindrical sleeve having opposite open ends defining a storage compartment therebetween;
   closure means threadably engageable with said sleeve opposite ends to seal said storage compartment;
   a plurality of spaced apart prongs joined at one end with a common base and cantilevered outwardly therefrom in spaced relationship;
   said common base having engagement means detachably carrying said prongs from a selected end of said sleeve;
   a spike pivotally carried on said sleeve having a closed position lying along the length of said sleeve and an operative position outwardly co-extending from the end of said sleeve opposite from its end carrying said prongs; and
   means selectively engageable with said spike for releasably holding said spike onto said sleeve in either its closed or operative position.

2. The invention as defined in claim 1 including:
   strap means encircling said prongs for releasably retaining said prongs against the handle of the fishing pole during a fishing procedure.

3. The invention as defined in claim 2 wherein:
   said means for releasably holding said spike in its respective positions comprises registered holes in said sleeve and spike for selectively inserting a pin.

4. The invention as defined in claim 3 wherein:
   said sleeve is provided an elongated recess in its external surface for receiving said spike when in its closed position.

5. The invention as defined in claim 4 wherein:
   said prongs and said sleeve are coaxially disposed when said common base is attached to the end of said sleeve.

6. The invention as defined in claim 5 wherein:
   said end of said sleeve opposite from its selected end carrying said prongs closed by a detachable cap having a pick projecting from one side and a threaded connector projecting from its opposite side;
   said selected end of said sleeve adapted to threadably engage with said cap threaded connector.

7. The invention as defined in claim 6 including:
   a plurality of survival implements adapted to be held in said storage compartment alongside said pick.

* * * * *